(12) United States Patent
Malkamäki et al.

(10) Patent No.: US 11,412,519 B2
(45) Date of Patent: Aug. 9, 2022

(54) CONTROL PLANE SIGNALING FOR INTEGRATED ACCESS AND BACKHAUL NODES

(71) Applicant: Nokia Technologies Oy, Espoo (FI)

(72) Inventors: Esa Malkamäki, Espoo (FI); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 100 days.

(21) Appl. No.: 16/961,966

(22) PCT Filed: Jan. 7, 2019

(86) PCT No.: PCT/IB2019/050107
§ 371 (c)(1),
(2) Date: Jul. 14, 2020

(87) PCT Pub. No.: WO2019/142064
PCT Pub. Date: Jul. 25, 2019

(65) Prior Publication Data
US 2021/0076368 A1  Mar. 11, 2021

Related U.S. Application Data

(60) Provisional application No. 62/619,479, filed on Jan. 19, 2018.

(51) Int. Cl.
*H04W 72/04* (2009.01)
*H04W 76/11* (2018.01)
(Continued)

(52) U.S. Cl.
CPC ........... *H04W 72/048* (2013.01); *H04W 4/20* (2013.01); *H04W 72/042* (2013.01);
(Continued)

(58) Field of Classification Search
CPC ... H04W 72/048; H04W 4/20; H04W 72/042; H04W 76/11; H04W 80/12; H04W 88/04;
(Continued)

(56) References Cited

U.S. PATENT DOCUMENTS 11,140,695 B1 * 10/2021 Eyuboglu ......... H04W 72/0433
2013/0114524 A1 * 5/2013 Sirotkin ............... H04B 7/0639
370/329

(Continued)

FOREIGN PATENT DOCUMENTS

RU    2578666 C2    3/2016

OTHER PUBLICATIONS

Office action received for corresponding Korean Patent Application No. 2020-7023737, dated Aug. 13, 2021, 6 pages of office action and 4 pages of Translation available.

(Continued)

*Primary Examiner* — Kiet Tang
(74) *Attorney, Agent, or Firm* — Squire Patton Boggs (US) LLP

(57) ABSTRACT

Various communication systems may benefit from improved network signaling. For example, certain embodiments may benefit from an improved connection between relay nodes and network entities. A method may include receiving at a user equipment part of an integrated access and backhaul node downlink information from a donor node. The downlink information may include F1 application protocol information. The method may also include forwarding the downlink information including the F1 application protocol information from the user equipment part of the integrated access and backhaul node to a radio access network part of the integrated access and backhaul node.

17 Claims, 8 Drawing Sheets

(51) Int. Cl.
*H04W 4/20* (2018.01)
*H04W 80/12* (2009.01)
*H04W 88/04* (2009.01)

(52) U.S. Cl.
CPC ............ *H04W 76/11* (2018.02); *H04W 80/12* (2013.01); *H04W 88/04* (2013.01)

(58) Field of Classification Search
CPC ... H04W 76/12; H04W 16/32; H04W 84/047; H04W 24/02; H04W 72/0433; H04W 76/15; H04B 7/2606; H04L 5/0023
See application file for complete search history.

(56) References Cited

U.S. PATENT DOCUMENTS

| | | | | |
|---|---|---|---|---|
| 2014/0056243 A1* | 2/2014 | Pelletier | ............... | H04W 72/042 370/329 |
| 2015/0103793 A1* | 4/2015 | Peng | ..................... | H04W 76/15 370/329 |
| 2019/0097874 A1* | 3/2019 | Zhou | ..................... | H04L 5/0023 |
| 2019/0223002 A1* | 7/2019 | Novlan | ................. | H04W 24/02 |

OTHER PUBLICATIONS

"3rd Generation Partnership Project; Technical Specification Group Radio Access Network; NG-RAN; F1 general aspects and principles (Release 15)", 3GPP TS 38.470, V0.5.0, Dec. 2017, pp. 1-11.
"Architecture and Protocols: MAC adaptation layer based IAB", 3GPP TSG-RAN WG2 NR Adhoc 1801, R2-1800392, Agenda item: 11.1, Nokia, Jan. 22-26, 2018, 5 pages.
"3rd Generation Partnership Project; Technical Specification Group Services and System Aspects; Service requirements for the 5G system; Stage 1 (Release 16)", 3GPP TS 22.261, V16.2.0, Dec. 2017, pp. 1-53.
"New SID Proposal: Study on Integrated Access and Backhaul for NR", 8881123GPP TSG RAN Meeting #75, RP-170821, Agenda: 9.1, AT&T, Mar. 6-9, 2017, 5 pages.
"3rd Generation Partnership Project; Technical Specification Group Radio Access Network; NG-RAN; F1 general aspects and principles (Release 15)", 3GPP TS 38.470, V1.0.0, Dec. 2017, pp. 1-11.
"3rd Generation Partnership Project; Technical Specification Group Radio Access Network: Evolved Universal Terrestrial Radio Access (E-UTRA): Radio Resource Control (RRC); Protocol specification (Release 14)", 3GPP TS 36.331, V14.4.0, Sep. 2017, pp. 1-753.
"3rd Generation Partnership Project; Technical Specification Group Radio Access Network NR Radio Resource Control (RRC) protocol specification (Release 15)", 3GPP TS 38.331, V15.0.0, Dec. 2017, pp. 1-188.
"3rd Generation Partnership Project; Technical Specification Group Radio Access Network: NR; Medium Access Control (MAC) protocol specification (Release 15)", 3GPP TS 38.321, V15.0.0, Dec. 2017, pp. 1-55.
International Search Report and Written Opinion received for corresponding Patent Cooperation Treaty Application No. PCT/IB2019/050107, dated Apr. 30, 2019, 13 pages.
"Architecture for Integrated Access and Backhaul", 3GPP TSG-RAN WG2 NR AH1801, R2-1801022, Agenda: 11.1, Ericsson, Jan. 22-26, 2018, pp. 1-9.
"Consideration on IAB Scenarios and Use Cases", 3GPP TSG-RAN WG2 Ad Hoc, R2-1801130, Agenda: 11.1, Huawei, Jan. 22-26, 2017, pp. 1-4.
"Deployment Scenarios and use Cases for Integrated Access Backhaul", 3GPP TSG-RAN WG2 NR AH1801, R2-1801021, Agenda: 11.1, Ericsson, Jan. 22-26, 2018, pp. 1-6.
Office action received for corresponding Russian Patent Application No. 2020125026, dated Oct. 28, 2020, 10 pages of office action and 4 pages of Translation available.
Korean Office Action issued in corresponding Korean Patent Application No. 2020-7023737 dated Feb. 21, 2022.

* cited by examiner

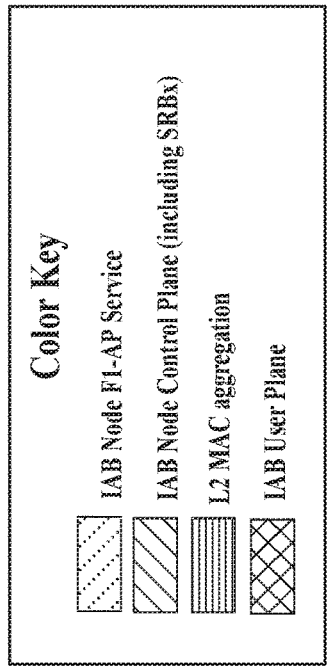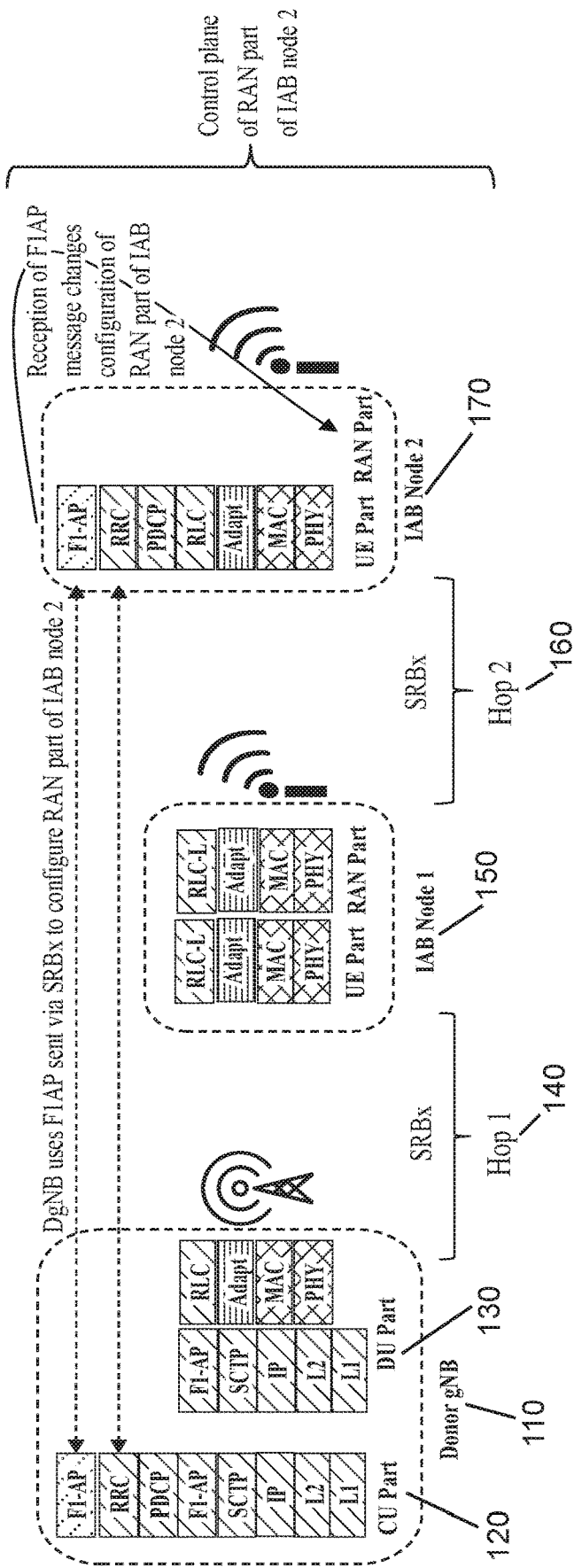
Figure 1

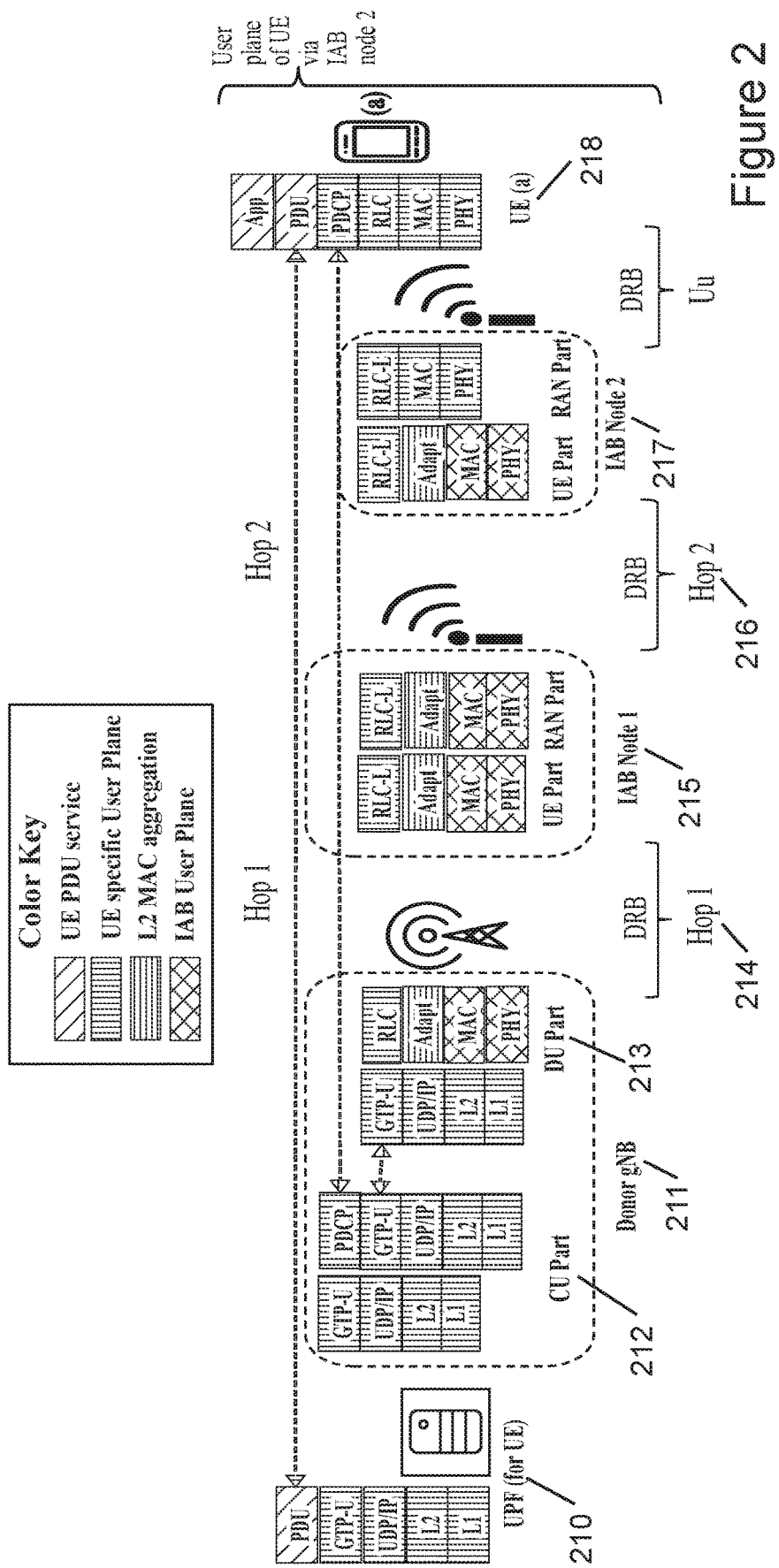

CONTROL PLANE SIGNALING FOR INTEGRATED ACCESS AND BACKHAUL NODES

RELATED APPLICATION

This application claims priority to PCT Application No. PCT/IB2019/050107 filed on Jan. 7, 2019, which claims priority to U.S. Provisional Application No. 62/619,479, filed on Jan. 19, 2018, each of which is incorporated herein by reference in its entirety.

BACKGROUND

Field

Various communication systems may benefit from improved network signaling. For example, certain embodiments may benefit from an improved connection between relay nodes and network entities.

Description of the Related Art

Third Generation Partnership Project (3GPP) New Radio (NR) or $5^{th}$ Generation (5G) technology include functions that allow for minimal manual effort to be performed when deploying a network using NR or 5G technology. For example, one function provided for is automated self-configuration. When utilizing higher frequency bands, NR or 5G technology also provides for easy coverage extension with minimized or no requirements of network planning or re-planning in a fast and cost-efficient manner. To help facilitate the above, a wireless backhaul is used to connect relay nodes, which are also referred to as Integrated Access and Backhaul (IAB) nodes, to each other and to base stations with a fixed connection.

As discussed above, a relay node (RN) or IAB node is included as part of a communication system that utilizes NR or 5G technology. One or more RN or IAB nodes are connected to one another. The RN or IAB node also has a wireless backhaul connection, instead of a wired connection, which connects the RN or IAB node to a donor 5G or NR NodeB (DgNB) or another IAB node. DgNB is a base station with a fixed connection to the network backhaul. A serving DgNB controls the usage of the radio resources in the communication system, and considers both access and backhaul links as part of the radio resource allocation.

SUMMARY

One example embodiment is directed to a method, which may include receiving at a user equipment part of an integrated access and backhaul node downlink information from a donor node, the downlink information comprising at least F1 application protocol information. The method may also include forwarding the downlink information comprising at least the F1 application protocol information from the user equipment part of the integrated access and backhaul node to a radio access network part of the integrated access and backhaul node.

Another example embodiment is directed to an apparatus, which may include at least one processor, and at least one memory including computer program code. The at least one memory and the computer program code are configured, with the at least one processor, to cause the apparatus at least to receive at a user equipment part of an integrated access and backhaul node downlink information from a donor node, the downlink information comprising at least F1 application protocol information. The apparatus may also be caused to forward the downlink information comprising at least the F1 application protocol information from the user equipment part of the integrated access and backhaul node to a radio access network part of the integrated access and backhaul node.

In an example embodiment, the donor node may include a donor node central unit for the downlink information. In another example embodiment, downlink information may be aggregated with other data on a backhaul link. According to a further example embodiment, a signaling radio bearer may be passed over the backhaul link, and the downlink information at the user equipment part of the integrated access and backhaul node may be received via the signaling radio bearer.

In another example embodiment, the downlink information may be received at the user equipment part of the integrated access and backhaul node as a radio resource control message or signal. According to an example embodiment, the signaling radio bearer may include an identifier, and the identifier may be a logical channel identifier. In an example embodiment the method may include identifying, based on an identifier within the radio resource control message or the logical channel identifier used for the signaling radio bearer, that the received downlink information should be forwarded to the radio access network part of the integrated access and backhaul node.

According to an example embodiment, the downlink information forwarded from the user equipment part of the integrated access and backhaul node to the radio network part of the integrated access and backhaul node updates a configuration of the radio access network part of the integrated access and backhaul node. In an example embodiment, the backhaul link may be used when the integrated access and backhaul node is in a radio link control acknowledged mode. According to an example embodiment, the backhaul link may include at least one of a radio link control layer, a medium access control layer, or an adaptation layer.

In a further example embodiment, the donor node central unit may include an internal user plane function. In yet another example embodiment, a signal of at least one of a non-access stratum service or a protocol data unit service may be transmitted via the integrated access and backhaul node. According to an example embodiment, the signaling radio bearer may terminate at the user equipment part of the integrated access and backhaul node.

Another example embodiment may be directed to an apparatus, which may include receiving means for receiving, at a user equipment part of an integrated access and backhaul node downlink information from a donor node, the downlink information comprising F1 application protocol information. The apparatus may also include forwarding means for forwarding the downlink information comprising at least the F1 application protocol information from the user equipment part of the integrated access and backhaul node to a radio access network part of the integrated access and backhaul node.

Another example embodiment may be directed to a method, which may include creating at a donor node, downlink information for an integrated access and backhaul node, wherein the downlink information comprises at least F1 application protocol information. The method may also include transmitting the downlink information comprising at least the F1 application protocol information from the donor node to a user equipment part of the integrated access and backhaul node.

Another example embodiment may be directed to an apparatus, which may include at least one processor, and at least one memory including computer program code. The at least one memory and the computer program code may be configured, with the at least one processor, to cause the apparatus at least to create at a donor node, downlink information for an integrated access and backhaul node, wherein the downlink information comprises at least F1 application protocol information. The apparatus may also be caused to transmit the downlink information comprising at least the F1 application protocol information from the donor node to a user equipment part of the integrated access and backhaul node.

In certain example embodiments, the donor node may include a donor node central unit for creating the downlink information. In another example embodiment, the downlink information may be aggregated with other data on a backhaul link. In an example embodiment, the downlink information created at the donor node central unit for the radio access network part of the integrated access and backhaul node may be at least F1 application protocol information encapsulated into radio resource control protocol information.

In another example embodiment, a signaling radio bearer may be passed over a backhaul link, and the downlink information transmitted to the user equipment part of the integrated access and backhaul node may be transmitted via the signaling radio bearer. According to another example embodiment, the downlink information is transmitted from the donor node central unit to the user equipment part of the integrated access and backhaul node as a radio resource control message or signal. In a further example embodiment, the signaling radio bearer may be identified by an identifier, and the identifier may be a logical channel identifier.

According to an example embodiment, the downlink information created at the donor node central unit for the radio access network part of the integrated access and backhaul node may be configured to update a configuration of the radio access network part of the integrated access and backhaul node. In another example embodiment, the backhaul link may be used when the integrated access and backhaul node is in a radio link control acknowledged mode.

According to another example embodiment, the backhaul link may include at least one of a radio link control layer, a medium access control layer, or an adaptation layer. According to a further example embodiment, the donor node central unit may include an internal user plane function. In another example embodiment, the signaling radio bearer may terminate at the user equipment part of the integrated access and backhaul node.

Another example embodiment may be directed to an apparatus that may include creating means for creating, at a donor node, downlink information for an integrated access and backhaul node, wherein the downlink information comprises at least F1 application protocol information. The apparatus may also include transmitting means for transmitting the downlink information comprising at least the F1 application protocol information from the donor node to a user equipment part of the integrated access and backhaul node.

BRIEF DESCRIPTION OF THE DRAWINGS

For proper understanding of the invention, reference should be made to the accompanying drawings, wherein:

FIG. 1 illustrates an example of a diagram according to certain embodiments.

FIG. 2 illustrates an example of a diagram according to certain embodiments.

FIG. 3 illustrates an example of a diagram according to certain embodiments.

DETAILED DESCRIPTION

Figure 3A:
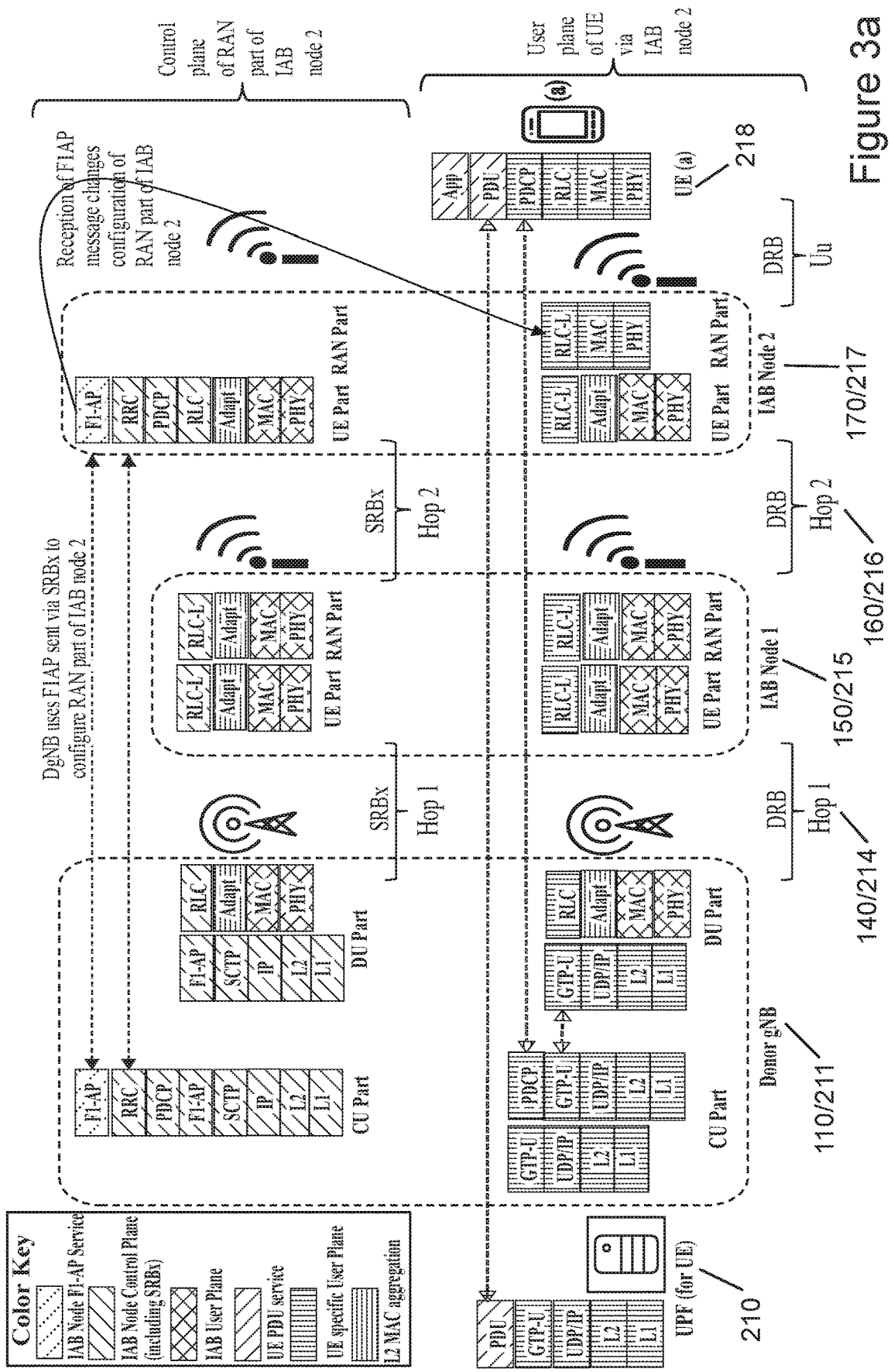
FIG. 3a illustrates an example of a diagram according to certain embodiments.

In 5G or NR technology, the IAB node may have a user equipment (UE) part, also known as a UE function or Mobile Termination (MT) function, which connects with the DgNB or another IAB node, in an embodiment that includes a multi-hop relaying. The IAB node may also include a radio access network (RAN) part, which serves the UEs or access UEs, as well as child IAB nodes connected to the IAB node, also known as the next hop IAB nodes. The RAN part may consist of a full gNB or a distributed unit (gNB-DU) part of a gNB. The UE part, in some embodiments, may be controlled by radio resource control (RRC) signaling. In other words, the UE part of the IAB node may utilize RRC similar to any normal UE, meaning that the donor gNB may configure the IAB node UE part by sending RRC reconfiguration messages to the IAB node.

Certain embodiments may help to support self-backhauling where the same carrier may be used for a backhaul connection, as well as for the access links. In other words, certain embodiment help to support an in-band backhaul operation. FIGS. 1 and 2 relate to the transport of control signaling to IAB node RAN part. In particular, the embodiments may allow for the extending of RRC information transfer to transmit F1 application protocol (F1AP) messages from the DgNB central unit (CU) to the RAN/DU part of the IAB node. In additional to, or in yet another embodiment, a specific type of a signaling radio bearer (SRB), referred to as SRBx, may be used to help transport F1 application protocol messages from DgNB CU to the RAN part of the IAB node. By using the SRBx, the UE and/or the IAB node may recognize the signals being transmitted according to Logical Channel IDs (LCID). In other words, in one embodiment RRC information transfer may be expanded to transport F1AP, while in another embodiment a SRBx may be used to transport F1AP.

Stream Control Transmission Protocol (SCTP) or Internet Protocol (IP) may be used to transport or transmit, in some embodiments, an F1 application protocol (F1AP) from a CU to a Distributed Unit (DU). With self-backhauling, the F1AP may be signaled or transmitted via a user plane function (UPF) for IAB node using a protocol data unit (PDU) session terminated in the UE part of the IAB node. In other words, a UPF, which may be located in a IAB node CU outside the donor node, may transmit the F1AP to a UE part of the IAB node. Such backhaul signaling, however, using the UPF does not fit well with Layer 2 (L2) relaying based self-backhauling since SCTP is, by definition, utilized above L2 protocols, and requires adding a specific header that identifies the protocol as such. Self-backhauling may be utilized as part of the automated self-configuration provided for by NR or 5G.

FIG. 1 illustrates an example of a diagram according to certain embodiments. In particular, FIG. 1 illustrates an example of an F1AP for controlling the IAB node RAN part, which may encapsulate the messages within the control plane traffic. For example, the messages may be included in a transparent container or SRB in the control plane traffic. Certain embodiments, as shown in FIG. 1, may include extending RRC Information Transfer to transmit F1AP messages, also referred to an F1AP information, from the DgNB CU to the RAN part of the IAB node. An SRB, such as SRBx, may also be used in the transmission of the F1AP information from the DgNB CU to an IAB node allowing the signaling to be recognized according to an identity, such as an LCID or information included within the RRC layer that transports the F1AP information. In other words, the LCID may be associated with the SRB, such as SRBx, or DRB through which data or downlink information may be received.

FIG. 1 illustrates a donor node 110, such as a DgNB, that includes a central unit part 120 and a distributed unit part 130. FIG. 1 also illustrates SRBx that may be established between RRC entities in DgNB CU and the UE part of the second IAB node. The same SRBx may be passed through first hop 140, located between the DgNB 110 and a first IAB node 150, and through a second hop 160, between first IAB node 150 and UE part of second IAB node 170. First hop 140 and second hop 160 may be wireless backhaul links. A message or signaling transmitted via the wireless backhaul link, illustrated as SRBx over first hop 140 and/or second hop 160, may be recognized using an identity, such as an LCID or information included within the RRC protocol. SRBx, for example, may have an x equal to 2 or may have an x equal to 4. The same value of x may apply to both hops shown in FIG. 1.

The cardinality of the SRB may relate to the priority of the SRB. Each SRB, for example, may be recognized to have a different priority according to the number x. For example, SRB2 may be defined as having lower priority than SRB1, and may be used for NAS message transfer, for example, On the other hand, SRB4 may be defined as having higher priority than SRB2, but lower priority than SRB1, and may be denoted as being used at least for the F1AP message transfer or transmission between the DgNB and the IAB node. In certain other embodiments, a higher SRB x number may mean a lower priority.

In certain embodiments, downlink information may be transmitted from the DgNB CU 120 to a RAN part of the IAB node via SRBx over first hop 140 and/or SRBx over second hop 160. In other words, the DgNB CU 120 may be for transmission to both DgNB DU 130 and the RAN part of the second IAB node 170, which may also be referred to as the IAB node DU part. The downlink information may include F1AP information. The downlink information, in some embodiments, may be transmitted using an RRC signaling, and may be transmitted in the form of RRC information, which is information contained within an RRC message. The signaling radio bearer, such as SRBx, may in some embodiments only be used when transporting the F1AP information. Only using the signaling radio bearer, such as SRBx, for transmitting F1AP information may allow for further differentiation or prioritization of the F1AP information over any other traffic. As shown in FIG. 1, the DgNB may use the F1AP, which may be sent via the SRBx, to configure the RAN part of the second IAB node. Reception of the F1AP information may change configuration of the RAN part of the IAB node.

Transmitting or transporting the F1AP information using the dedicated signaling radio bearer, for example SRB4, over the wireless backhaul links and/or the RRC information transfer, for example using SRB2, may allow for a decreased protocol overhead in over-the-air, wireless transmissions. For example, in certain embodiments no IP or SCTP headers may be needed. As such, no IP header having a minimum of 20 bytes may be needed, and/or no SCTP header having a minimum of 16 bytes may be needed. When using the dedicated signaling radio bearer over the wireless backhaul link, the overheard from the RRC messages transmitted to the RAN part of IAB node may also be minimized. In addition, the embodiment shown in FIG. 1 may not use a user plane function (UPF) to transmit the F1AP information, which allows for using the same DgNB CU for both DgNB DU and the RAN part of the IAB node. FIG. 1 further allows for a reliable transport of messages by using SRBs. At least one of the SRBs, for example, may use a Radio Link Control (RLC) acknowledged mode (AM), which can help to provide for reliable transmission of F1AP information transmitted through the SRB.

FIG. 2 illustrates an example of a diagram according to certain embodiments. In particular, FIG. 2 illustrates a user plane, having a UPF 210, used for UE traffic to and from an UE via an L2 based IAB node. As can be seen in FIG. 2, the DgNB 211 may have a CU-DU split. A radio bearer may be provided between DgNB CU packet data convergence protocol (PDCP) 212 and a UE PDCP 218. The IAB nodes shown in FIG. 2 may include similar functions as DgNB DU 213. In certain embodiments, the IAB node may only host at least one lower L2 protocol layer, such as the RLC layer, a Medium Access Control (MAC) layer, and/or a physical (PHY) layer.

HARQ retransmissions, in some embodiments, may be transmitted separately for each hop, such as first hop 214 and second hop 216, as well as for Uu interface between IAB node and UE. A DRB may be passed over first hop 214 and/or second hop 216 and over the Uu interface. The example shown in FIG. 2 illustrates only an RLC-L (low or light) in a first IAB node 215 and a second IAB node 217, which may mean that the RLC in the IAB nodes may perform segmentation/re-segmentation, when needed, as well as RLC PDU buffering. RLC retransmissions may be end-to-end between the DgNB DU 213 and UE 218. In other embodiments, IAB nodes 215, 217 may host full RLC, which means that the RLC retransmissions may be performed in each hop. When the RLC retransmissions are performed in each hop 214, 216, a DgNB with a split CU-DU, similar to the split shown in FIG. 2, may be utilized.

As shown in FIG. 2, there may be a UE tunnel between UPF 210 and DgNB CU 212, and an F1 tunnel between DgNB CU 212 and DgNB DU 213. L2 MAC aggregation may be performed on first hop 214 and second hop 216. The first hop 214 and the second hop 216 may be similar to first hop 140 and second hop 160, shown in FIG. 1, and may allow for a user plane transmission to and from the IAB node. In certain embodiments, a user plane function may be included in DgNB DU part 213, first IAB node 215, and/or second IAB node 217. A user specific user tunnel may be provided from between DgNB DU part 213 and UE 218.

FIG. 3 illustrates an example of a diagram according to certain embodiments. Specifically, FIG. 3 illustrates an example of a MAC PDU structure. The MAC PDU structure, in certain embodiments, may be the same as an NR MAC PDU structure specified in TS 38.321, except for the UE ID(s) added for MAC service data unit (SDU). When the UE ID may be added by a separate adaptation layer to become part of the MAC SDU, the MAC PDU may be the same as MAC PDU as specified in TS 38.321. 3GPP TS 38.321 is hereby incorporated by reference in its entirety.

The MAC PDU 310 may include subheaders including an LCID, a MAC control element (MAC CE), a user equipment identification (ID) and/or a MAC SDU. In addition to RLC and MAC, the backhaul link may include an adaptation layer. The adaptation layer may be a separate layer, in some embodiments, or it may be part of the MAC or the RLC. The UE traffic of a plurality of UEs served by one or more IAB nodes, such as first IAB node 150 and second IAB node 170 in FIG. 1 and IAB node 215 and IAB node 217 in FIG. 2, may be aggregated into a single backhaul transport channel using the wireless backhaul links. A backhaul transport channel may mean a transport channel used over the backhaul link.

In certain embodiments, the UE traffic aggregation by the one or more IAB nodes, may be referred to as MAC or adaptation layer aggregation. In certain embodiments, the adaptation layer, or alternatively the MAC or the RLC layer, may add a UE ID for each MAC PDU or MAC SDU. The UE ID may be used for routing in the self-backhauling tree under a DgNB. The self-backhauling tree may include one or more IAB nodes connected to each other.

FIG. 3a illustrates an example of a diagram according to certain embodiments. In particular, FIG. 3a illustrates a combination of the diagrams shown in FIGS. 1 and 2, in which the F1AP information may be transmitted or forwarded from the UE part of the second IAB node 170/217 to the RAN part of the second IAB node 170/217. The upper part of FIG. 3a illustrates the Control Plane of the second IAB node and the lower part illustrates the User Plane from an access UE point of view. The communication system shown in FIG. 3a, illustrates DgNBs 110/211, first hops 140/214, first IAB nodes 150/215, second hops 160/216, second IAB nodes 170/217, UPF 210, and UE 218. RAN part of second IAB node 170/217, which may be located in the user plane, may receive downlink information, such as F1AP information, from UE part of second IAB node 170, which may be located in the control plane. IAB node 2 170 and IAB node 2 217 are the same IAB node, 170 represents the control plane operation and 217 the user plane operation. Same applies to other network elements in the figure, such as DgNB and IAB node 1.

Figure 4:
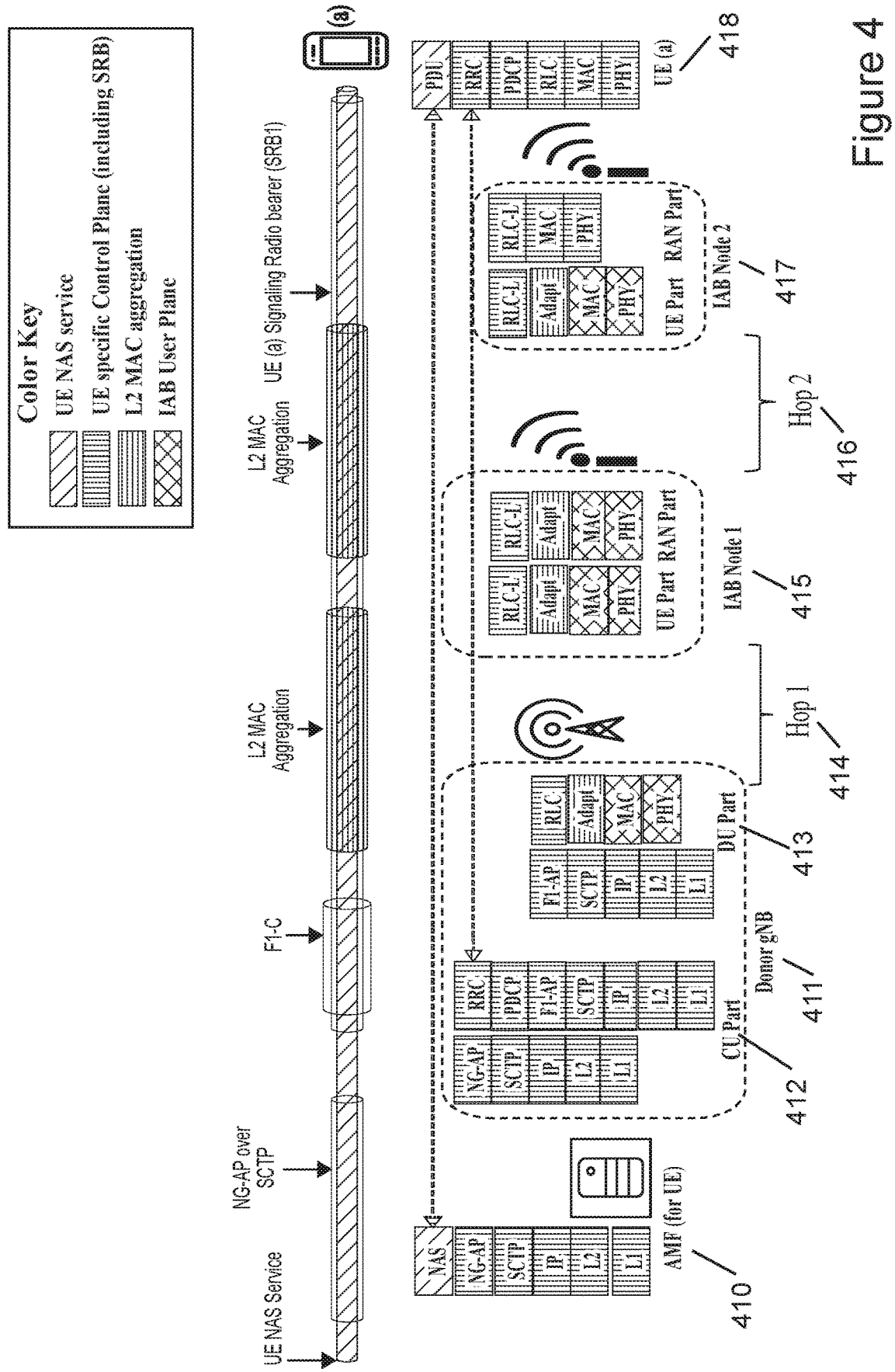
FIG. 4 illustrates an example of a diagram according to certain embodiments.

FIG. 4 illustrates an example of a diagram according to certain embodiments. Specifically, FIG. 4 illustrates a UE control plane for L2 relaying using IAB nodes. As can be seen in FIG. 4, a UE Non-Access Stratum (NAS) service is provided for in the communications system. The communications system includes an Access and Mobility Function (AMF) 410, a DgNB 411 that includes a CU part 412 and a DU part 413, a first hop 414, a first IAB node 415, a second hop 416, a second IAB node 417, and a UE 418. The embodiment shown in FIG. 4 may be similar to the embodiment shown in FIG. 2, except that FIG. 2 relates to a PDU service in a user plane for UE traffic, while FIG. 4 relates to a NAS service in a control plane for UE traffic.

The network side RRC may be in a DgNB CU 412, and one or more user specific user tunnels or SRBs may be provided between DgNB CU 412 and UE 418. Data traffic between DgNB 411 and UE 418 may be transmitted using an IAB transport channel, which may include L2 MAC layer aggregation or L2 adaptation layer aggregation. In certain embodiments, the NAS signaling may be between AMF 410 and UE 418, and may be transported using RRC signaling, for example an RRC Information Transfer. As can be seen in FIG. 4, F1AP information may be transmitted from DgNB CU 412 to DgNB DU 413.

Figure 5:
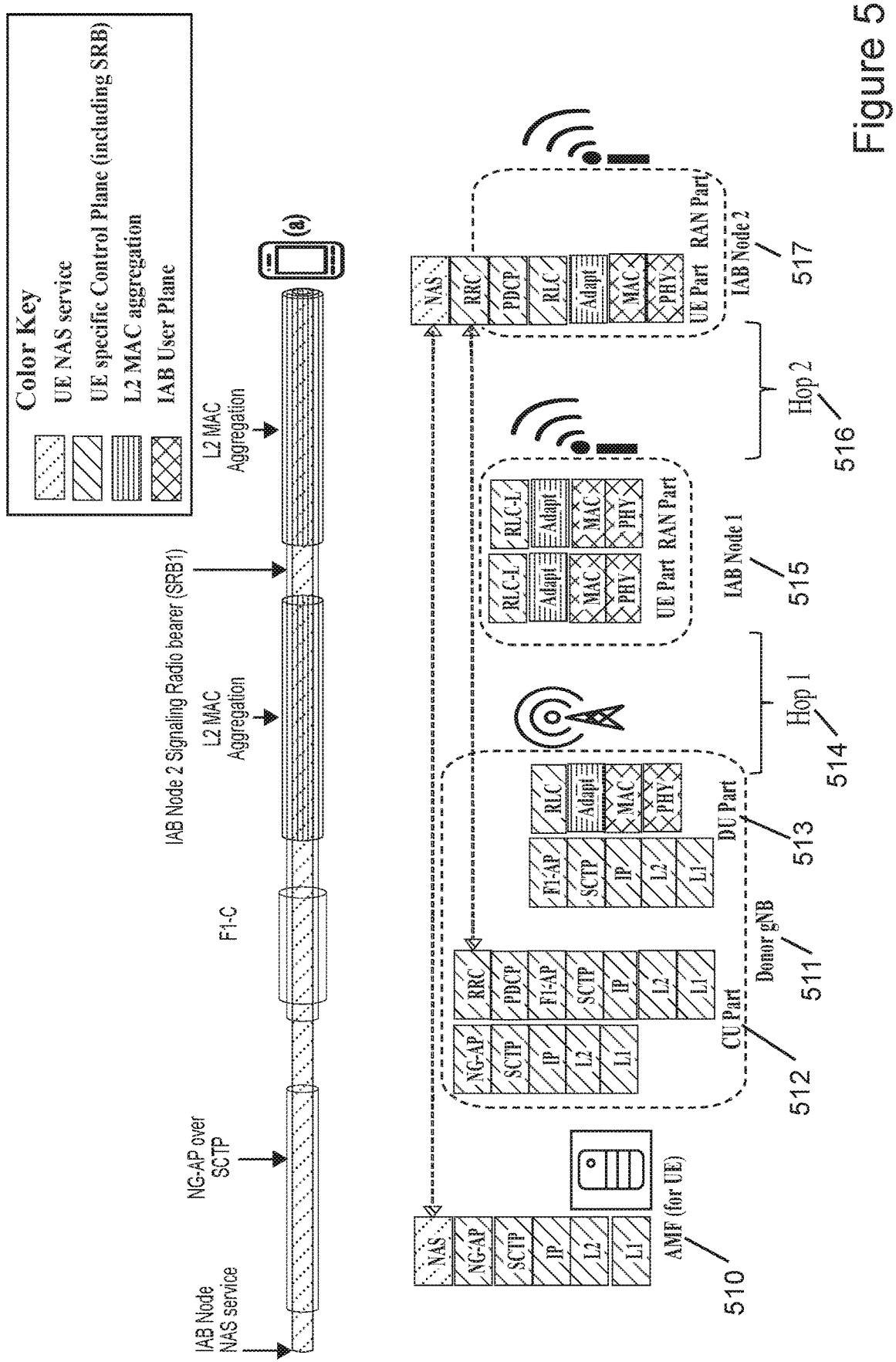
FIG. 5 illustrates an example of a diagram according to certain embodiments.

FIG. 5 illustrates an example of a diagram according to certain embodiments. In particular, FIG. 5 illustrates a control plane for a UE part of the IAB node. As shown in FIG. 5, the IAB node NAS service may be transmitted in a communications network that includes AMF 510, DgNB 511 that includes a CU part 512 and a DU part 513, a first hop 514, a first IAB node 515, a second hop 516, and a second IAB node 517. A new radio application protocol (NGAP) over the SCTP may be used to connect AMF 510 and the DgNB CU 512, an F1 control plane used to connect DgNB CU 512 and DgNB DU 513, and an L2 MAC aggregation used to connect DgNB DU part 513 and first IAB node 515, as well as first IAB node 515 and second IAB node 517.

IAB nodes 515 and 517, as shown in FIG. 5, may have a UE part which receives and/or transmits downlink or uplink information via backhaul link IAB nodes 515 and 517 may also have a RAN part, also referred to as an IAB node DU part, which may receive and/or transmit uplink or downlink information in an access direction. The RAN part of the IAB node may communicate with the UE itself or with a UE part of the next hop IAB node. The UE part of the IAB node may function similar to a UE, but in addition to the UE functions, the UE part of the IAB node may also support any enhancement specified for the backhaul link. The enhancement specified for the backhaul link, for example, may be located in the MAC layer and/or the adaptation layer.

In certain embodiments, the control of the UE part of the IAB node, such as the reconfiguration of the PHY, the MAC, the RLC, or the adaptation layer, may be performed using RRC signaling. The UE part of the IAB node, for example, may terminate the SRB which carries RRC and NAS signaling. RRC may be located in the DgNB CU, while NAS may be located in the AMF. The SRB terminated in a UE part of the IAB node may be transported over the backhaul links together with, or separate from, the normal UE traffic. The aggregation shown in FIG. 5 may, in some embodiments, be an aggregated in the same transport channel of the UE traffic and the SRB. In order to help facilitate routing and multiplexing, the UE part of the IAB node may have an identification, which may be a UE ID, similar to other 3GPP access UEs. The UE ID may be included in the downlink information transmitted from the DgNB to help the IAB node identify an access UE or the UE part of the IAB node, or the downlink information forwarded from the UE part of the IAB node. In other embodiments, the RAN part of the IAB node may identify the downlink link used to update configuration of the RAN part.

DgNB CU 512 may control the DgNB DU 513 using an F1AP when the DgNB 511 includes a CU-DU split. Therefore, certain embodiments the DgNB CU 512 may be used to transmit F1AP information to DgNB DU 513 and to the RAN part of the IAB node. In accordance with the above embodiments, F1AP information may be transmitted from DgNB CU 512 to IAB nodes 515, 517 over one or more backhaul links or hops 514, 516. The F1AP may be transported in a CU-DU split over SCTP and/or IP. When using SCTP and/or IP for transmissions between DgNB CU and the IAB nodes, the IP packets may be routed via an internal UPF located in, or collocated with, the DgNB CU. The internal UPF located in DgNB CU may be used to handle the IP routing to IAB nodes and/or UEs. Certain embodiments may use a PDU session and/or a data radio bearer (DRB) which may be terminated in the IAB node.

In certain embodiments that include a multi-hop self-backhauling link or one or more individual self-backhauling links, as shown in FIGS. 1-5, a RAN protocol and/or a SRB may be used to wirelessly transmit F1AP information. In other words, a RAN protocol and/or a SRB may be used to transmit the F1AP information over a wireless backhaul link. In the embodiments shown in FIGS. 1-5, the SRB content may not be tunneled from the CU. Furthermore, a SRB may be used instead of a DRB in order to have a lossless fixed F1AP interface, similar to F1AP over SCTP, between DgNB CU and DgNB DU. For example, user plane traffic between DgNB CU and DgNB DU may use GPRS tunneling protocol user data tunneling (GTP-U).

In some embodiments, an RRC information transfer may be used. Downlink information may be transmitted via the UE part of the IAB node to the RAN or DU part of the IAB node. The downlink information may support or may include F1AP information. The UE part receiving the downlink information may be in an RRC connected mode. In some embodiments, uplink information transfer procedures from the IAB node may also support F1AP protocol signaling. Such embodiment, for example, may be similar to NAS signaling transfer where the recipient may infer the intended destination of the message from the structure of the message. Both RRC procedures, as well as ASN.1, may be enhanced to support the transmission of F1AP information to the IAB node.

As shown in FIG. 1, an SRBx may be used for transmission of the F1AP. One type of SRB, for example SRB4, may be specified for F1AP information transmission between DgNB CU and the RAN part or DU part of the IAB node. Since SRBs may utilize fixed LCIDs, information transmitted from the DgNB CU may be identified when the SRBx is used for a F1AP transmission. The F1AP information or message, in some embodiments, may therefore be transmitted directly from the F1AP layer to PDCP layer of SRB4, and the receiver can route the message to the F1AP layer.

Downlink information, such as F1AP, may be transmitted from a DgNB CU to a RAN part of the IAB node, also referred to as the IAB node gNB DU, via a UE part of the IAB node in an RRC connected mode. In other words, the dedicated information of the F1 application protocol may be used to transfer RAN part/DU IAB node specific F1AP information between the network and the IAB node. In certain embodiments, the UE and the RAN parts of the IAB node may both be in an RRC connected mode, while in certain other embodiments the UE and the RAN parts of the IAB node may be in different modes. For example, the UE part of the IAB node may be in a connected mode, while the RAN part of the IAB node may be in an inactive mode. The RAN, in certain embodiments, may initiate the transmission of downlink information when there is a need to transfer F1AP dedicated information. The RAN may initiate the downlink information transfer, for example, by transmitting a downlink information transfer message from the DgNB to the IAB node. Upon receiving the downlink information, the IAB node or the UE part of the IAB node may identify the F1AP, and forward the received information to the F1AP upper layers, for example to the entity handling F1AP.

An IAB control message, in some embodiments, may be used for the transmission of downlink information. The downlink information may include the F1AP information. The downlink information may be transmitted via a wireless backhaul, for example via SRB4. In certain embodiments, the downlink information may also be transmitted on a downlink control channel, and the RLC service access point may be in an acknowledgement mode. In an acknowledgement mode, the RLC entity may be configured to transmit or receive PDUs through the downlink or uplink control channel.

Figure 5A:
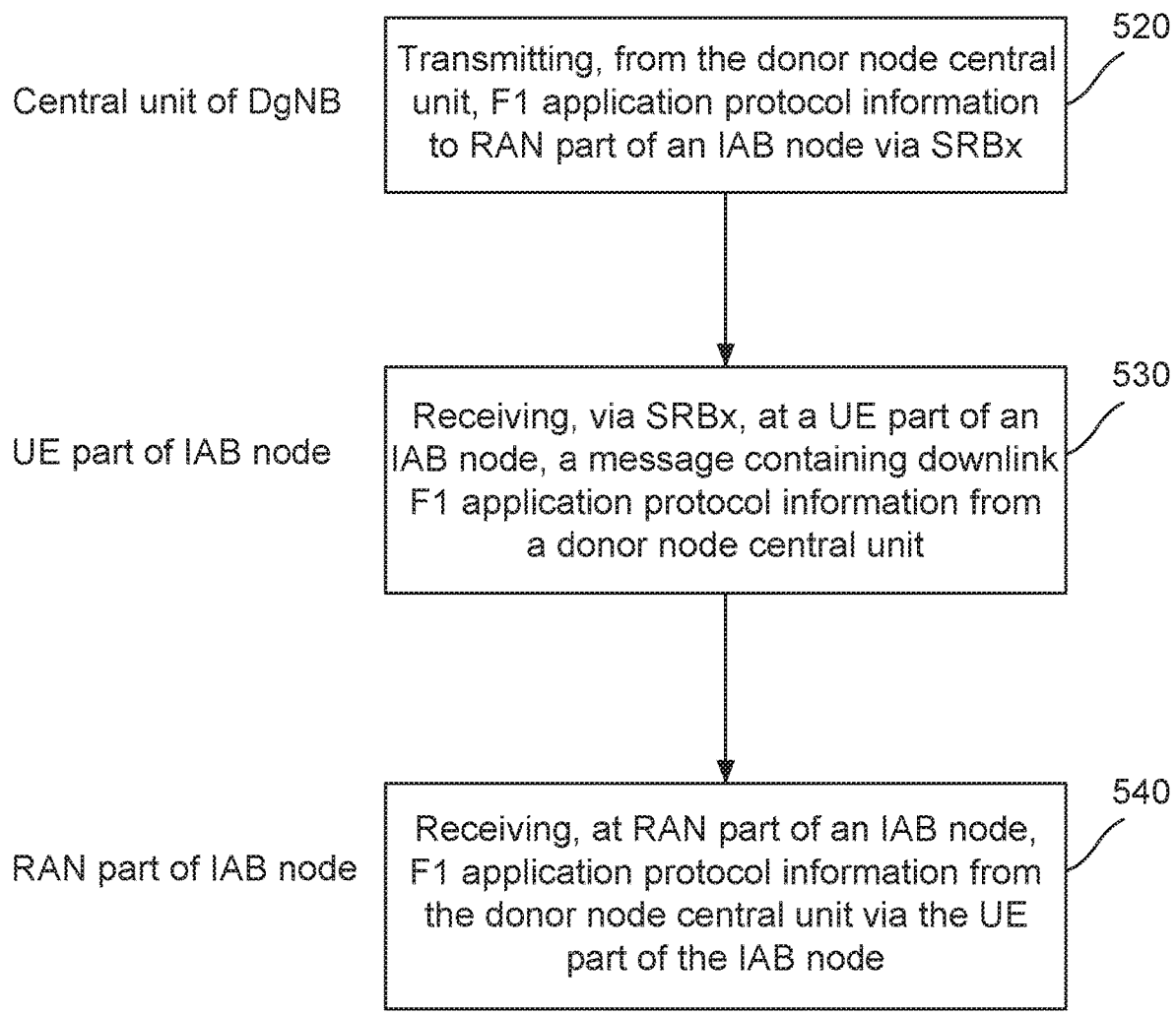
FIG. 5a illustrates an example of a flow diagram according to certain embodiments.

FIG. 5a illustrates an example of a flow diagram according to certain embodiments. In step 520, the donor node central unit, for example DgNB CU, may transmit or forward F1 application information to RAN part of the IAB node. In some embodiments, the F1 application information may be transmitted via an SRB, such as an SRBx. In step 530, the UE part of the IAB node may receive, for example via the SRBx, a message including the downlink F1 application protocol information transmitted from the donor node central unit in step 520. In step 540, the RAN part of the IAB node may receive the F1 application protocol information from the donor node central unit via the UE part of the IAB node. In other words, the UE part of the IAB node may forward the F1 application information, and the RAN part of the IAB node may receive the F1 application information forwarded from the UE part of the IAB node.

Figure 6:
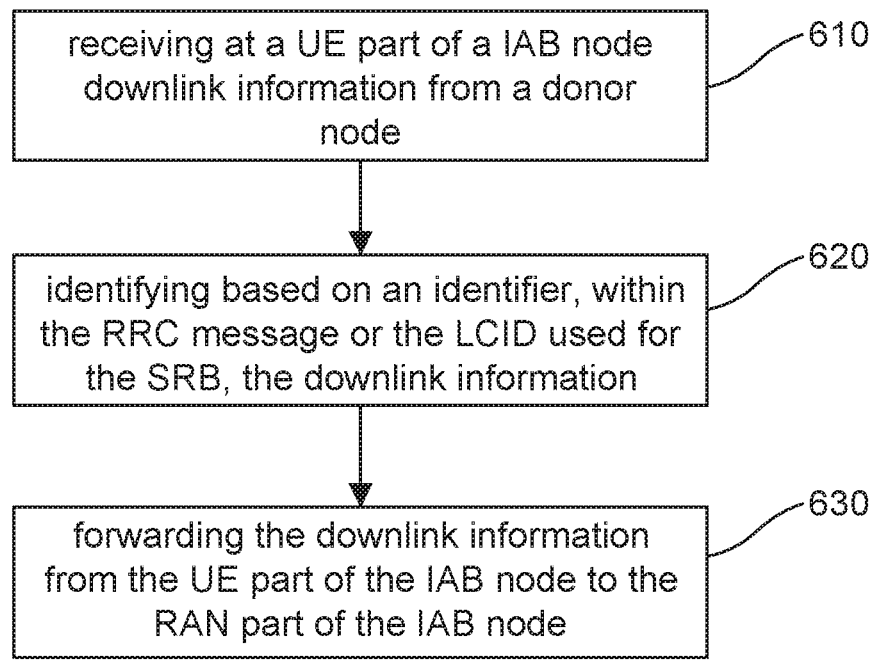
FIG. 6 illustrates an example of a flow diagram according to certain embodiments.

FIG. 6 illustrates an example of a flow diagram according to certain embodiments. In particular, FIG. 6 illustrates a method or process performed by a UE part of the IAB node. In step 610, the UE part of the IAB node may receive downlink information from a donor node, such as a DgNB. The downlink information may include F1 application protocol information. In one embodiment, the donor node may include a donor node central unit for creating the downlink information. In some embodiments, the donor node central unit may include an internal UPF. The downlink information, for example, may be aggregated with other data on a backhaul link located between the DgNB CU and the UE part of the IAB node, or between the DgNB CU and the RAN part of the IAB node. In certain embodiments, a SRB may be passed over the backhaul link. The backhaul link, in certain embodiments, may be used when the IAB node is in an RLC AM. The backhaul link may include at least one of a RLC layer, a MAC layer, or an adaptation layer. The downlink information received at the UE part of the IAB node may be received via the SRB. In some embodiments, the downlink information may be received at the UE part of the IAB node as an RRC message or signal.

The SRB may include an identifier, such as an LCID. The SRB may terminate at the UE part of the IAB node. In step 620, the UE part of the IAB node may identify, based on an identifier within the RRC message or the LCID used for the SRB, that the received downlink information should be forwarded to the RAN part of the IAB node. In step 630, the UE part of the IAB node may forward the downlink information, which may include the F1 application protocol information, to the RAN part of the IAB node.

The downlink information forwarded from the UE part of the IAB node to the RAN part of the IAB node may update a configuration of the RAN part of the IAB node. In other words, the RAN part of the IAB node may update the configuration of the RAN part of the IAB node based on the identified configuration received from donor node central unit via the UE part of the IAB node. The RAN part of the IAB node may identify, based on the downlink information or the F1 application information, the updated configuration of the RAN part of the IAB node. In some embodiments, a signal of at least one of a NAS service or a PDU service may be transmitted via the IAB node.

Figure 7:
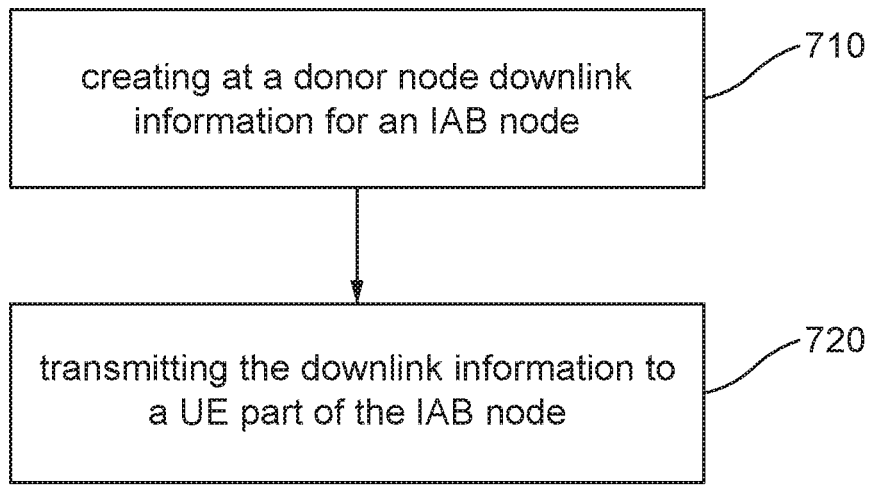
FIG. 7 illustrates an example of a flow diagram according to certain embodiments.

FIG. 7 illustrates an example of a flow diagram according to certain embodiments. In particular, FIG. 7 illustrates a method or process performed by a donor node central unit, for example a DgNB. In step 710, the donor node may create or compose downlink information for an IAB node. In certain embodiments, in which the donor node may be split into CU-DU, the donor node central unit may create or compose downlink information for an IAB node. The donor node central unit, in some embodiments, may include an internal user plane function. The downlink information may include F1 application protocol information. The downlink information created at the donor node central unit may be configured for a RAN part of the IAB node. In some embodiments, the downlink information may be transmitted from the donor node central unit to the UE part of the IAB node to reconfigure or configure the UE part of the IAB node. The downlink information created at the donor node central unit for the RAN of the IAB node may be an RRC protocol information comprising the F1 application protocol information. The downlink information created at the donor node central unit for the RAN part of the IAB node may be configured to update a configuration of the RAN part of the IAB node.

In step 720, the method may include transmitting the downlink information including the F1 application protocol information from the donor node central unit to a UE part of the IAB node via a backhaul link. The downlink information may be aggregated with other data on the backhaul link. The backhaul link may be used when the integrated access and backhaul node is in a radio link control acknowledged mode. The backhaul link may include at least one of a RLC layer, a MAC layer, or an adaptation layer. In certain embodiments, a SRB may be passed over the backhaul link, and the downlink information transmitted to the UE part of the IAB node may be transmitted via the SRB. The SRB may include an identifier, and the identifier may be an LCID. In some embodiments, the SRB may terminate at the UE part of the IAB node. In one embodiment, the F1AP information may be transferred by extending RRC information transfer to transport F1AP. In this embodiment, F1AP information may be encapsulated inside an RRC message which may be sent to the UE part of IAB node using an existing SRB, for example SRB2. In another embodiment, another SRB may be specified, for example SRB4, to transport F1AP information. In the latter embodiment, F1AP information may not be encapsulated into RRC message, instead the F1AP message as such is send over the another SRB. Normally, SRBs transfer RRC messages but here in the latter embodiment, RRC may not be involved in the transfer of F1AP information.

As discussed above, in certain embodiments, the donor node central unit, for example the DgNB CU, may compose or create F1 application protocol information for RAN part of the IAB. In addition, the donor central unit may compose or create RRC protocol information including the F1 application protocol information for the UE part of the IAB node. The donor node central unit may then transmit the F1 application protocol information to the RAN part of the IAB node via an SRB, such as SRBx. The F1 application protocol information may be transmitted from the donor node central unit to the RAN part of the IAB node via the UE part of the IAB node.

Figure 8:
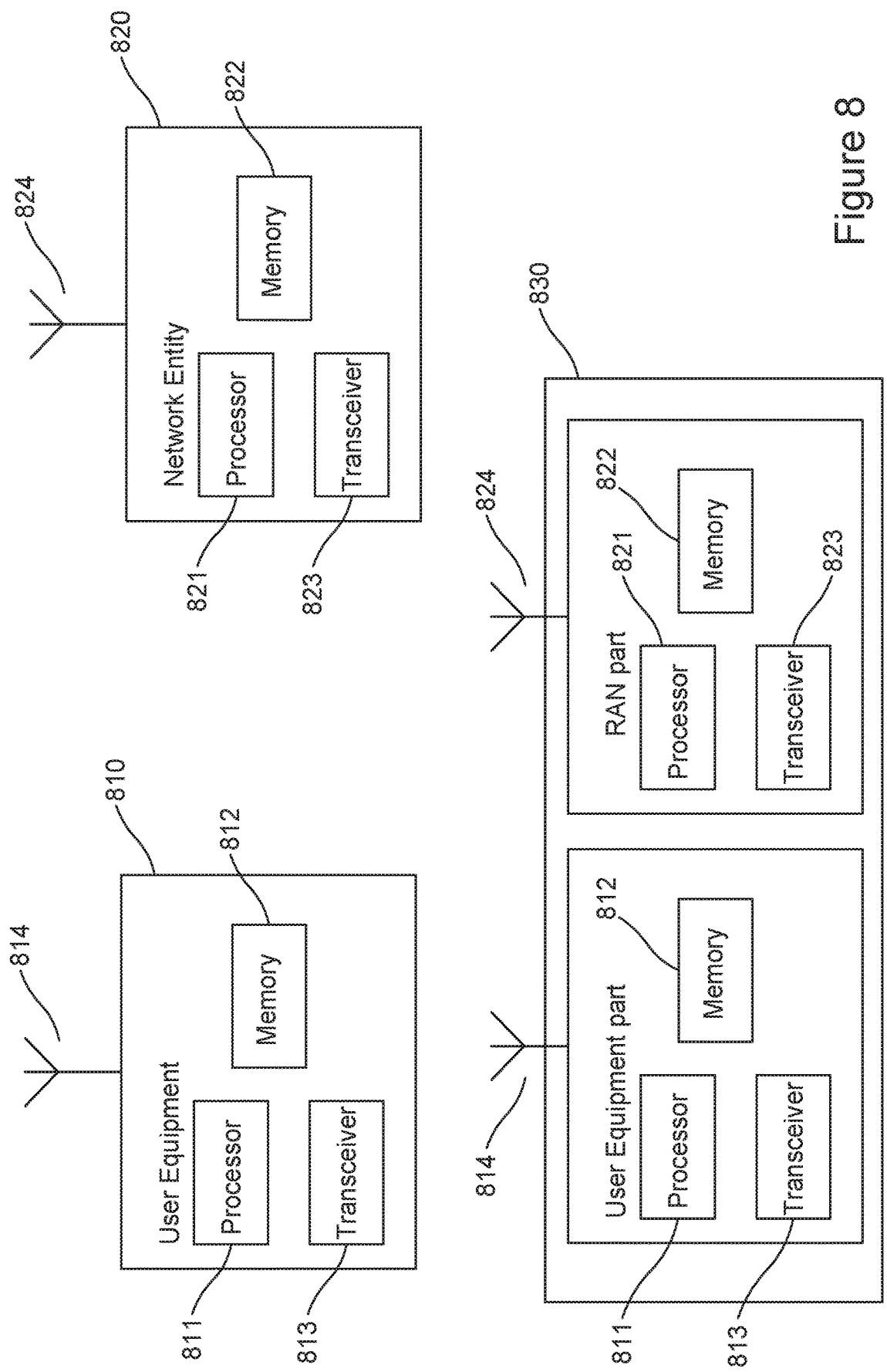
FIG. 8 illustrates an example of a system according to certain embodiments.

FIG. 8 illustrates a system according to certain embodiments. It should be understood that each block in FIGS. 1-7 may be implemented by various means or their combinations, such as hardware, software, firmware, one or more processors and/or circuitry. In one embodiment, a system may include several devices, such as, for example, a network entity 820 or a UE 810. The system may include more than one UE 810 and more than one network entity 820, although only one network entity is shown for the purposes of illustration. The network entity may be a network node, an access node, a base station, an evolved NodeB (eNB), a 5G or NR NodeB (gNB), a donor gNB, a host, a server, or any of the other access or network node discussed herein.

In certain embodiments, an IAB node 830, may include a UE part which is similar to UE 810 for communication with the donor node or a parent IAB node's RAN part, in a multi-hop embodiment, and a RAN part which may be similar to a network entity 820 for communication with access UEs or a next hop IAB node UE part. In certain embodiments, therefore, a single IAB node may include at least two processors 811, 821, at least two transceivers 813, 823, at least two memories 812, 822, and at least two antennas 814, 824. In other embodiments the processors, transceivers, memories and/or antennas may be shared between the UE part and the RAN part of the IAB node.

Each of these devices may include at least one processor or control unit or module, respectively indicated as 811 and 821. At least one memory may be provided in each device, and indicated as 812 and 822, respectively. The memory may include computer program instructions or computer code contained therein. One or more transceiver 813 and 823 may be provided, and each device may also include an antenna, respectively illustrated as 814 and 824. Although only one antenna each is shown, many antennas and multiple antenna elements may be provided to each of the devices. Higher category UEs generally include multiple antenna panels. Other configurations of these devices, for example, may be provided. For example, network entity 820 and UE 810 may be additionally configured for wired communication, in addition to wireless communication, and in such a case antennas 814 and 824 may illustrate any form of communication hardware, without being limited to merely an antenna.

Transceivers 813 and 823 may each, independently, be a transmitter, a receiver, or both a transmitter and a receiver, or a unit or device that may be configured both for transmission and reception. In other embodiments, the network entity may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the UE may be a machine type communication (MTC) device or an Internet of Things device, which may not require human interaction, such as a sensor, a meter, an actuator.

In some embodiments, an apparatus, such as user equipment 810 or network entity 820, may include means for performing or carrying out embodiments described above in relation to FIGS. 1-7. In certain embodiments, the apparatus may include at least one memory including computer program code and at least one processor. The at least one memory including computer program code can be configured to, with the at least one processor, cause the apparatus at least to perform any of the processes described herein. The apparatus, for example, may be user equipment 810 or network entity 820.

Processors 811 and 821 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 820 or UE 810, to perform any of the processes described above (see, for example, FIGS. 1-7). Therefore, in certain embodiments, a non-transitory computer-readable medium may be encoded with computer instructions or one or more computer program (such as added or updated software routine, applet or macro) that, when executed in hardware, may perform a process such as one of the processes described herein. In other embodiments, a computer program product may encode instructions for performing any of the processes described above, or a computer program product embodied in a non-transitory computer-readable medium and encoding instructions that, when executed in hardware, perform any of the processes describes above. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1-6. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Specific examples of circuitry may be content coding circuitry, content decoding circuitry, processing circuitry, image generation circuitry, data analysis circuitry, or discrete circuitry. The term circuitry may also be, for example, a baseband integrated circuit or processor integrated circuit for a mobile device, a network entity, or a similar integrated circuit in server, a cellular network device, or other computing or network device.

Furthermore, although FIG. 8 illustrates a system including a network entity 820 and UE 810, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 810 may likewise be provided with a variety of configurations for communication other than communication network entity 820. For example, the UE 810 may be configured for device-to-device, machine-to-machine, and/or vehicle-to-vehicle transmissions.

The above embodiments may provide for significant improvements to the functioning of a network and/or to the functioning of the user equipment and the network entities included within the network. In particular, the above embodiments allow for efficiently extending the 5G or NR signaling using regular ASN.1 extension mechanisms, such as using a non-critical extension via an "empty SEQUENCE", for example, an ASN.1 SEQUENCE whose contents are left open at the time of definition and only defined later on. In another embodiments, an ASN.1 extension mechanism may be an extension addition group, for example an ASN.1 extension mechanism where an "ellipsis" marker is defined within the ASN.1 code, marking a location where new fields later can be created after the ellipsis marker later on using predefined syntax, or an open OCTET STRING, for example an ASN.1 field defined OCTET STRING but without content, with the content being defined at a later period. The embodiment may also help to decrease protocol overhead in wireless transmissions, by utilizing an SRBx and/or an RRC transfer information. The DgNB CU may also be used for both the DgNB DU and/or the RAN part of the IAB node, which helps to reduce the resources needed for F1AP transmissions.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary

AMF Access and Mobility Function
BH Backhaul
CU Central Unit
DRB Data Radio Bearer
DU Distributed Unit
F1AP F1 Application Protocol
F1-C F1 Control plane
F1-U F1 User plane
GTP-U GPRS Tunnelling Protocol User data tunneling
IAB Integrated Access and Backhaul
MAC Medium Access Control
NAS Non-Access Stratum
PDCP Packet Data Convergence Protocol
PDU Protocol Data Unit
RAN Radio Access Network
RLC Radio Link Control
RN Relay Node
RRC Radio Resource Control
SCTP Stream Control Transmission Protocol
SRB Signaling Radio Bearer
UE User Equipment
UPF User Plane Function

We claim:

1. A method, comprising:
receiving at a user equipment part of an integrated access and backhaul node downlink information from a donor node, the downlink information comprising at least F1 application protocol information; and
forwarding the downlink information comprising at least the F1 application protocol information from the user equipment part of the integrated access and backhaul node to a radio access network part of the integrated access and backhaul node,
wherein the downlink information is received at the user equipment part of the integrated access and backhaul node as a radio resource control message or signal.

2. The method according to claim 1, wherein a signaling radio bearer is passed over a backhaul link, and wherein the downlink information received at the user equipment part of the integrated access and backhaul node is received via the signaling radio bearer.

3. The method according to claim 2, wherein the signaling radio bearer is identified by an identifier, and the identifier is a logical channel identifier.

4. An apparatus, comprising:
at least one processor; and
at least one memory comprising computer program code,
wherein the at least one memory and the computer program code are configured, with the at least one processor, to cause the apparatus at least to:
receive at a user equipment part of an integrated access and backhaul node downlink information from a donor node, the downlink information comprising at least F1 application protocol information; and
forward the downlink information comprising at least the F1 application protocol information from the user equipment part of the integrated access and backhaul node to a radio access network part of the integrated access and backhaul node,
wherein the downlink information is received at the user equipment part of the integrated access and backhaul node as a radio resource control message or signal.

5. The apparatus according to claim 4, wherein downlink information is aggregated with other data on a backhaul link.

6. The apparatus according to claim 4, wherein a signaling radio bearer is passed over a backhaul link, and wherein the downlink information received at the user equipment part of the integrated access and backhaul node is received via the signaling radio bearer.

7. The apparatus according to claim 6, wherein the signaling radio bearer is identified by an identifier, and the identifier is a logical channel identifier.

8. The apparatus according to claim 4, wherein the at least one memory and the computer program code are configured, with the at least one processor, to cause the apparatus further to identify, based on an identifier within a radio resource control message or a logical channel identifier used for a signaling radio bearer, that the received downlink information should be forwarded to the radio access network part of the integrated access and backhaul node.

9. The apparatus according to claim 4, wherein the downlink information forwarded from the user equipment part of the integrated access and backhaul node to the radio access network part of the integrated access and backhaul node updates a configuration of the radio access network part of the integrated access and backhaul node.

10. The apparatus according to claim 4, wherein the backhaul link of the integrated access and backhaul node is configured to use radio link control acknowledged mode.

11. The apparatus according to claim 4, wherein the backhaul link comprises at least one of a radio link control layer, a medium access control layer, or an adaptation layer.

12. The apparatus according to claim 4, wherein a signal of at least one of a non-access stratum service or a protocol data unit service is transmitted via the integrated access and backhaul node.

13. The apparatus according to claim 4, wherein the signaling radio bearer terminates at the user equipment part of the integrated access and backhaul node.

14. An apparatus, comprising:
at least one processor; and
at least one memory comprising computer program code,
wherein the at least one memory and the computer program code are configured, with the at least one processor, to cause the apparatus at least to:
create at a donor node, downlink information for an integrated access and backhaul node, wherein the downlink information comprises at least F1 application protocol information; and
transmit the downlink information comprising at least the F1 application protocol information from the donor node to a user equipment part of the integrated access and backhaul node,
wherein the downlink information is transmitted from the donor node central unit to the user equipment part of the integrated access and backhaul node as a radio resource control message or signal.

15. The apparatus according to claim 14, wherein the donor node comprises a donor node central unit for creating the downlink information.

16. The apparatus according to claim 14, wherein a signaling radio bearer is passed over a backhaul link, and wherein the downlink information transmitted to the user part of the integrated access and backhaul node is transmitted via the signaling radio bearer.

17. The apparatus according to claim 16, wherein the signaling radio bearer comprises an identifier, and wherein the identifier is a logical channel identifier.

\* \* \* \* \*